United States Patent
Pisklak (10) Patent No.: US 10,041,669 B2
(45) Date of Patent: Aug. 7, 2018

(54) CATALYTIC BURNER

(71) Applicant: Stonewick, LLC, Dallas, TX (US)

(72) Inventor: Thomas J. Pisklak, Cypress, TX (US)

(73) Assignee: Stonewick, LLC, Dallas, TX (US)

( * ) Notice: Subject to any disclaimer, the term of this patent is extended or adjusted under 35 U.S.C. 154(b) by 0 days.

(21) Appl. No.: 15/361,290

(22) Filed: Nov. 25, 2016

(65) Prior Publication Data

US 2017/0074508 A1    Mar. 16, 2017

Related U.S. Application Data

(63) Continuation-in-part of application No. 13/843,214, filed on Mar. 15, 2013, now Pat. No. 9,598,654,
(Continued)

(51) Int. Cl.
| | |
|---|---|
| *F23C 13/02* | (2006.01) |
| *F23D 14/18* | (2006.01) |
| *F23D 5/12* | (2006.01) |
| *F23D 11/44* | (2006.01) |
| *F23D 3/02* | (2006.01) |
| *F23Q 11/00* | (2006.01) |
| *F23Q 25/00* | (2006.01) |

(Continued)

(52) U.S. Cl.
CPC ............... *F23D 3/02* (2013.01); *F23C 13/02* (2013.01); *F23D 3/24* (2013.01); *F23D 5/126* (2013.01); *F23D 11/448* (2013.01); *F23D 14/18* (2013.01); *F23Q 11/00* (2013.01); *F23Q 21/00* (2013.01); *F23Q 25/00* (2013.01); *B01J 32/00* (2013.01); *F23D 2203/107* (2013.01); *F23D 2900/03081* (2013.01); *G08C 17/02* (2013.01); *H04W 4/80* (2018.02)

(58) Field of Classification Search
CPC ........... B01J 32/00; F23B 90/08; F23C 13/02; F23D 3/02; F23D 3/24; F23D 3/40; F23D 5/126; F23D 11/448; F23D 14/18; F23D 2203/107; F23D 2206/0063; F23D 2207/00; F23D 2900/03081; F23D 2900/13001; F23Q 11/00; F23Q 21/00; F23Q 25/00; F24J 1/00
USPC ..... 431/7, 11, 127, 147, 203, 206, 207, 268, 431/287, 298, 310, 312, 313, 314, 320, 431/322, 323, 325; 126/401–414; 422/5, 422/126, 125; 514/421
IPC ............ B01J 32/00; F23B 90/08; F23C 13/02; F23D 3/02,3/40, 5/12, 11/44, 14/18; F23Q 11/04; F24J 1/00
See application file for complete search history.

(56) References Cited

U.S. PATENT DOCUMENTS 550,961 A  *  12/1895  Galtier ...................... F23D 3/32
                                                           431/103
651,100 A  *  6/1900  Blakeley ................... A61L 9/03
                                                           422/126
(Continued)

FOREIGN PATENT DOCUMENTS

EP         1491818 A1 * 12/2004  .............. F23C 13/00
GB         1163830         9/1969
(Continued)

*Primary Examiner* — Gregory Huson
*Assistant Examiner* — Daniel E Namay
(74) *Attorney, Agent, or Firm* — Winstead PC (57) ABSTRACT

A catalytic burner with electric start. The method of using the catalytic burner comprises an electric-start device that may actuated via a switch or remotely via radio signal.

18 Claims, 7 Drawing Sheets

Related U.S. Application Data which is a continuation-in-part of application No. 11/974,455, filed on Oct. 12, 2007, now Pat. No. 9,279,583.

(60) Provisional application No. 60/851,235, filed on Oct. 12, 2006.

(51) Int. Cl.
  *F23Q 21/00* (2006.01)
  *F23D 3/24* (2006.01)
  *B01J 32/00* (2006.01)
  *F24J 1/00* (2006.01)
  *G08C 17/02* (2006.01)
  *H04W 4/80* (2018.01)

(56) References Cited

U.S. PATENT DOCUMENTS

| | | | | |
|---|---|---|---|---|
| 2,482,794 A | * | 9/1949 | Peterson | F23Q 2/162 141/330 |
| 2,997,869 A | * | 8/1961 | Weiss | B23K 1/00 431/147 |
| 3,529,911 A | | 9/1970 | Townsend | |
| 3,664,651 A | * | 5/1972 | Meneret | C22B 60/0213 266/168 |
| 3,876,365 A | | 4/1975 | Hefling et al. | |
| 4,416,298 A | * | 11/1983 | Berghammer | A45D 2/36 132/232 |
| 4,555,232 A | * | 11/1985 | Raccah | A45D 20/06 126/401 |
| 4,635,382 A | * | 1/1987 | Bourdeau | A45D 20/06 126/401 |
| 4,849,181 A | * | 7/1989 | Kelley | A61L 9/03 239/54 |
| 4,968,487 A | * | 11/1990 | Yamamoto | A01M 1/04 210/504 |
| 5,215,456 A | * | 6/1993 | Fujiwara | F23D 14/18 126/406 |
| 5,394,862 A | * | 3/1995 | Firatli | A45D 1/02 126/409 |
| 5,450,841 A | * | 9/1995 | Whitaker | F23N 1/005 126/512 |
| 5,591,395 A | * | 1/1997 | Schroeder | A01M 1/2077 422/125 |
| 5,898,013 A | * | 4/1999 | Mifune | F23Q 2/30 431/268 |
| 6,033,212 A | * | 3/2000 | Bonnema | A01M 1/2083 239/139 |
| 6,099,806 A | * | 8/2000 | Cortellucci | A62B 21/00 422/120 |
| 6,773,679 B2 | * | 8/2004 | Jaworski | A01M 1/2077 392/392 |
| 6,932,594 B2 | * | 8/2005 | Weclas | F23C 99/006 431/11 |
| 9,279,583 B2 | * | 3/2016 | Pisklak | F23D 3/40 |
| 2003/0064002 A1 | * | 4/2003 | Jaworski | A01M 1/2077 422/28 |
| 2004/0151598 A1 | * | 8/2004 | Young | F04B 17/00 417/208 |
| 2005/0066663 A1 | | 3/2005 | Alvin et al. | |
| 2005/0089453 A1 | * | 4/2005 | Huang | A61L 9/03 422/125 |
| 2005/0147540 A1 | * | 7/2005 | Huang | A61L 9/037 422/125 |
| 2008/0014539 A1 | * | 1/2008 | Pisklak | C10L 1/02 431/268 |

FOREIGN PATENT DOCUMENTS

| | | | | |
|---|---|---|---|---|
| JP | 57134609 A | * | 8/1982 | A45D 1/02 |
| JP | 2001324109 A | * | 11/2001 | A01M 1/2088 |
| JP | 2002047114 A | * | 2/2002 | A01N 25/20 |
| JP | 2005016925 A | * | 1/2005 | F23C 13/00 |
| JP | 2005016926 A | * | 1/2005 | A01M 1/2088 |

* cited by examiner

CATALYTIC BURNER

CROSS REFERENCES TO RELATED APPLICATIONS

This application is a continuation-in-part of application Ser. No. 13/843,214, filed on Mar. 15, 2013, which is a continuation-in-part of application Ser. No. 11/974,455 filed on Oct. 12, 2007, which claims the benefit of U.S. Provisional Application 60/851,235, filed Oct. 12, 2006, each of which is incorporated herein by reference as if fully set forth herein.

FIELD OF THE INVENTION

The invention relates to a burner comprising an electrically activated catalyst that provides flameless combustion of fuels.

BACKGROUND OF THE INVENTION

The invention represents an improvement over existing technology in use with burners, such as those described in U.S. Pat. No. 6,144,801, U.S. Pat. No. 6,451,841, U.S. Pat. No. 6,537,061, U.S. Pat. No. 6,814,929, U.S. 20050037309 and U.S. 20040265762. The aforementioned systems are composed of a burner, fuel, fuel reservoir, and a wick. The burners are composed of three main components: a porous ceramic body, a catalyst that is embedded in the porous ceramic body, and a wick that is inserted into the porous ceramic body.

The porous ceramic body is typically formed through the addition of a combustible material, such as carbon powder or sawdust, to a mixture of talc, clay, and binder to form a ceramic precursor. Once this mixture is extruded or molded into a desired shape the body is then calcined at >1,000° C. to form the finished ceramic body. During the calcination process, the included combustible material is vaporized leaving voids, or pores in the ceramic body. Typical catalytic burners have an open porosity of ~40%.

The catalyst is typically a stabilized alumina or silica microparticle supported precious metal catalyst such as those described in U.S. Pat. No. 4,029,602, U.S. Pat. No. 4,048,113, U.S. Pat. No. 4,301,035, and U.S. Pat. No. 4,368,029. The microparticle catalyst is mixed into liquid solution which is then applied to the surface of the porous ceramic body. The catalyst microparticles are smaller than the pores of the ceramic body, and are absorbed into the ceramic body and remain in place once the liquid is removed, in this manner the catalyst is embedded into the porous ceramic body.

The wick is typically composed of cotton or cellulose fiber, and is long enough so that it extends from the interior of the ceramic body to the bottom of the fuel reservoir. The fuel may be composed of 90 wt % 2-propanol, 8 wt % $H_2O$, and 2 wt % fragrance.

To operate the catalytic burners, the burner assembly is first placed on top of a fuel reservoir with the wick extending into the fuel/fragrance mixture. The fuel/fragrance mixture travels up the wick and into the pores of the porous ceramic body. Once the porous ceramic body is completely saturated, an open flame is applied to the surface of the ceramic body to ignite the absorbed fuel/fragrance mixture. The open flame is removed and the ignited fuel/fragrance mixture is allowed to burn. The burning fuel/fragrance mixture, which produces a ~6 inch flame, is extinguished after ~3 minutes. The igniting process serves two functions; first the flame consumes and/or desorbs the excess fuel from the porous ceramic body and second, once the excess fuel is desorbed, the flame heats the embedded catalyst particles to the appropriate temperature (~150° C.) for continued operation. This starts a cyclical process in which the ceramic absorbs heat from the catalyst, the heated ceramic body vaporizes the fuel in the wick, the vaporized fuel passes over the catalyst and is combusted, and the catalytic combustion process provides heat back to the ceramic body. During this process the majority of the fuel/fragrance mixture is not consumed by the catalyst but is emitted into the surrounding atmosphere at a high rate, typically ~12.0 grams/hour.

Wick degradation occurs because, to achieve the necessary communication of the fuel with the catalytic burner, the wick must be in intimate contact with the catalytic burner, which can exceed temperatures of 250° C. during operation. The elevated temperature causes the cellulose wick to degrade and carbonize. Degradation of the wick causes the loss of fuel flow to the catalytic burner due to accumulation of the carbonized wick material in the pores of the ceramic burner and loss of intimate contact between the ceramic body and wick. The loss of fuel flow eventually causes irreversible failure of the catalytic burner. Clogging of the pores can also occur from accumulation of partially decomposed fragrance. During normal operation, a portion of the fragrance is not evaporated, but instead is decomposed inside the pores of the ceramic body. Over time, build up of this decomposed material occludes the pores of the ceramic and prevents the fuel vapor from reaching the catalyst. The large flame that is necessary for start-up is a drawback of the system due to safety concerns. The large flame could easily ignite nearby drapes, paper, or other items, thereby causing uncontrolled fires.

To overcome the above problems, a system has been developed in which the use of ceramic or other porous materials in the construction of burners is eliminated.

SUMMARY OF THE INVENTION

Embodiments of the inventions remedy the aforementioned deficiencies found in the current prior art systems. Embodiments of the invention relate to the objective of providing a burner comprising an electrically started catalyst that provides improved combustion through efficient use.

Generally, flameless combustion is accomplished by preheating combustion air and fuel gas sufficiently that when the two streams are combined the temperature of the mixture exceeds the auto-ignition temperature of the mixture, but to a temperature less than that which would result in the oxidation upon mixing being limited by the rate of mixing. Without a catalyst surface present, preheating of the streams to a temperature between about 1,500° F. and about 2,300° F. and then mixing the fuel gas into the combustion air in relatively small increments is required in order for flameless combustion to occur.

Preheating of the fuel gases to obtain flameless combustion without a catalyst would result in significant generation of carbon unless a carbon formation suppressant is included in the fuel gas stream. The need to provide such a carbon formation suppressant is therefore avoided by operating the burner in the presence of a catalyst.

In general, the invention relates to a catalytic burner that is capable of self-sustained operation after initial start up with an electrically started catalytic burner. According to an embodiment of the invention, the catalytic burner operates on a fuel mixture that is contained in a reservoir and delivered to the burner via an absorbent wick. Initial ignition is accomplished by using an electrical source to heat up the catalyst without an open flame or spark. According to embodiments of the invention, ignition is accomplished by pressing a button to close an electrical circuit, the closing of which supplies electrical energy to an ignition unit. Responsive to being supplied with electrical energy, the ignition unit applies heat to the catalyst to raise a temperature of the catalyst to a desired temperature. The substrate is preferably rapidly brought to a temperature at which a flameless combustion is sustained to minimize the time period at which a flame exists within the burner. The rate of heating the substrate will typically be limited by the thermal gradients the burner can tolerate.

According to an embodiment of the invention, the catalyst and housing are heated in response to an electrically started catalytic burner and the temperature is raised to a suitable working temperature. Once the appropriate working temperature is reached the catalyst begins to combust the fuel.

In an embodiment of the invention, the combustion of the fuel occurs in a cyclical manner. The catalyst and housing are heated responsive to an electrically started catalytic burner and the temperature is raised to a suitable working temperature. When the appropriate working temperature is reached, the catalyst begins to combust the fuel, thus heating the substrate upon which the catalyst is deposited. The catalyzed substrate in turn heats the tube body containing the wick. The heated tube body heats the fuel saturated wick contained within the tube body. The heating of the wick vaporizes the fuel. The fuel vapors flow over the catalyst and are combusted by the catalyst. The excess heat generated by the combustion of the fuel heats the tube body. The heated tube body in turn heats the wick, thereby repeating the fuel combustion cycle.

According to an embodiment of the invention, the bulk of the fuel is not consumed by the catalyst during this process, but is emitted into the surrounding atmosphere at a high rate. In certain embodiments of the invention, the fuel is emitted into the atmosphere at ~9.0 to 12.0 grams/hour. The emission of the fuel into the atmosphere by an embodiment of the invention provides a suitable vehicle by which volatile substances such as fragrances, perfumes and other products that are soluble in the fuel may be emitted into the atmosphere.

In an embodiment of the invention, the fuel may contain one or more chemical compounds. In such an embodiment, the fuel/chemical compound mixture comes into intimate contact with the catalyst to transform the chemical compound(s) in some fashion. In certain embodiments, the transformation of the chemical compound(s) enhances the combustion of the fuel.

In some embodiments, by carefully selecting the material from which the tube body of the catalytic burner is constructed, the wick can be situated so that it is not in direct contact with the tube body. This lack of contact between the wick and the tube body greatly reduces the rate at which the wick is degraded and increases the lifetime of the burner. If loss of fuel flow occurs due to wick degradation, the degraded wick can easily be replaced with a new wick without loss of function. Although the fragrance may still be partially degraded and remain on the wick, the wick continues to function.

In a typical embodiment, ignition of the catalyst is achieved without a flame. In some embodiments, a non-porous catalyst is used. Since the non-porous catalyst is situated over or around the tube body containing the saturated wick and does not contact the wick, there is no need to desorb the fuel from the catalyst to achieve ignition. Rather, the only requirement is that the system receives enough heat to reach the working temperature of the catalyst. In certain embodiments of the invention, the catalyst and the tube body are heated and the temperature is raised to a suitable working temperature of around 250° C. In certain embodiments of the invention, the amount of fuel that is required to sustain combustion of the catalyst is absorbed in a very short time after the wick comes into contact with the fuel. In an embodiment of the invention using a non-porous ceramic catalyst, the amount of time for the wick to absorb an effective amount of fuel to sustain combustion of the catalyst is less than 5 minutes.

According to an embodiment of the invention, the catalytic burner is composed of three main parts: an absorbent wick, a tube body, and a catalyst that has been deposited on a suitable substrate. The construction of the burner and the geometry of the supported catalyst, allow the catalytic burner to operate continuously for extended periods of time. In certain embodiments of the invention, a catalytic burner that is constructed and operated as set forth herein can operate continuously for around 184 hours.

According to an embodiment of the invention, the housing can be composed of any metal or metal alloy such as (but not limited to): brass, brass alloy, medium leaded brass, high leaded brass, extra high leaded brass, free cutting brass, phosphor bronze, free cutting phosphor bronze, aluminum bronze, brass, bronze, brass or bronze alloy, aluminum, aluminum alloys, or stainless steels.

In certain embodiments, the housing can be composed of other non-porous materials such as glass and high density ceramic. The housing can be formed in any shape that is suitable for holding a wick. Examples of suitable shapes for the housing include a collar-style housings or tube-style housings.

DETAILED DESCRIPTION OF EXEMPLARY EMBODIMENTS

Various embodiments of the present invention will now be described more fully with reference to the accompanying drawings. The invention may, however, be embodied in many different forms and should not be construed as limited to the embodiments set forth herein.

The use of start-up oxidants and/or fuels is preferred only until the catalyst has been heated to a temperature sufficient to enable operation with a fuel of choice and air as the oxidant. According to embodiments of the invention, methanol, ethanol, propanol, butanol, dimethyl ketone, ethyl acetate, methane, ethane, propane, butane, propylene glycol, dimethylformamide or any other suitable fuel known in the prior art can be used as the working fuel in embodiments of the invention.

Figure 1:
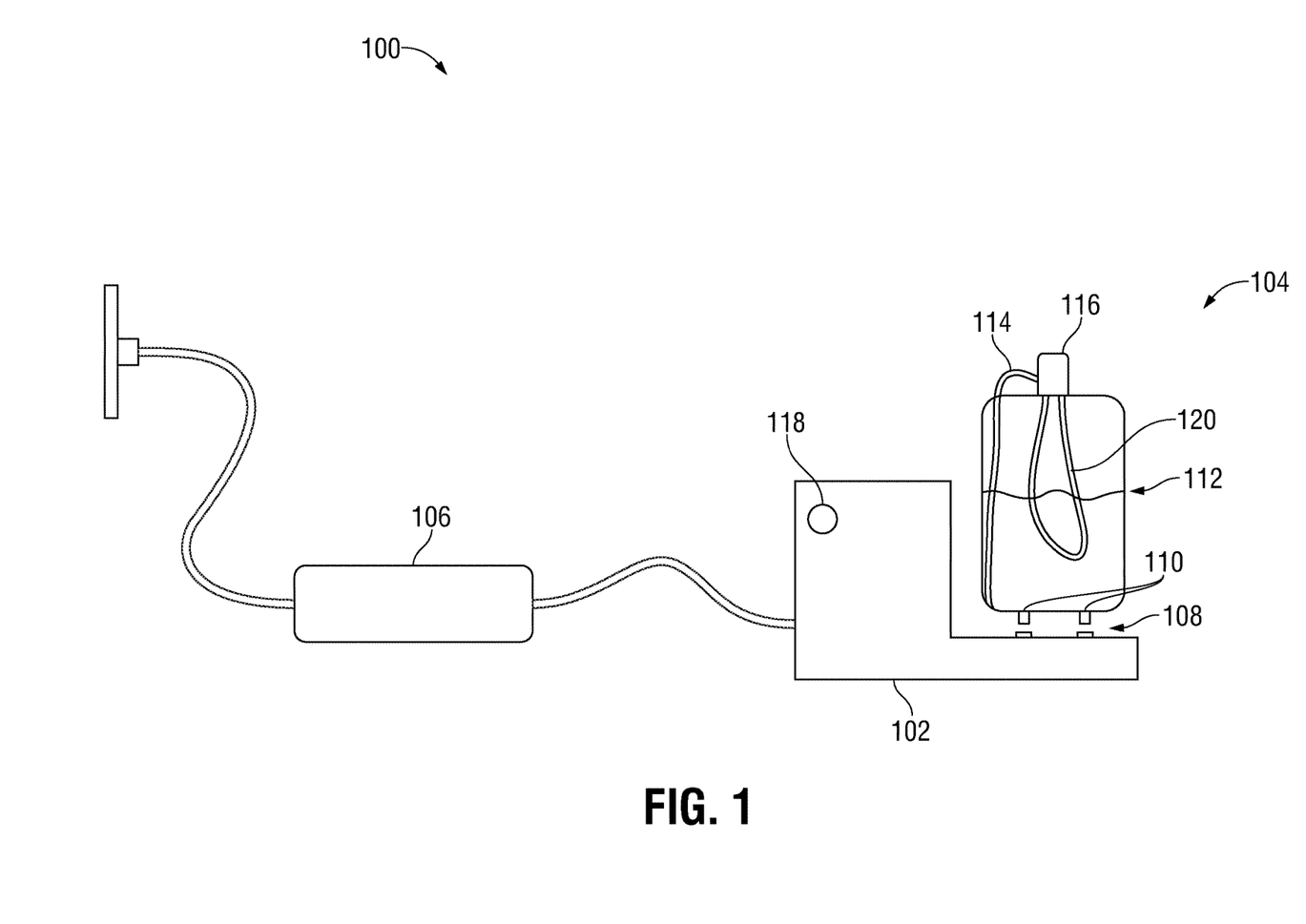
FIG. 1 illustrates a system for electrical activation of a catalytic burner.

FIG. 1 illustrates a system 100 for electrical activation of a catalytic burner. The system 100 includes a controller unit 102, a catalytic burner device 104, and a power supply 106. The controller unit 102 includes a pair of electrical contacts 108 that are adapted to contact a pair of electrical contacts 110 located, in a typical embodiment, on a bottom of a fuel reservoir 112 of the catalytic burner device 104. The pair of contacts 108 and 110 enables the controller unit 102 to transmit electrical power via a wire 114 to a catalytic burner 116. Power is supplied to the control unit 102 via the power supply 106. In alternative embodiments, the pair of electrical contacts 110 could be located on a side of the fuel reservoir 112. In such an embodiment, the pair of contacts 108 are positioned on the controller unit 102 to enable contact between the pair of contacts 108 and 110.

In a typical embodiment, the controller unit 102 includes means for controlling an amount of power delivered to the catalytic burner device 104. In a typical embodiment, the means includes a pc board that is adapted to control an amount of volts and amps delivered to the catalytic burner device 104. The controller unit 102 also includes an ignition activator 118. In a typical embodiment, the ignition activator 118 is a button. Activating the ignition activator 118 (e.g., pressing the button) causes the controller unit 102 to supply electrical power to the catalytic burner 116 to heat up the catalytic burner 116 to a temperature sufficient ignite fuel provided to the catalytic burner 116 via a wick 120 that extends from the catalytic burner 116 into the fuel reservoir 112. In other embodiments, the ignition activator 118 may be any of a variety of other switches.

In some embodiments, the ignition activator 118 may be activated remotely. For example, the controller unit 102 may include a wireless radio (e.g., WiFi, Bluetooth, cellular, and the like) to receive an instruction from a remote device to supply electrical power to the catalytic burner 116. The remote device may be a smart phone, a tablet, a remote, a computer system, and the like. Upon receiving an instruction from the remote device, the controller unit 102 supplies electrical power to the catalytic burner 116.

In a typical embodiment, the power supply 106 is adapted to connect to a standard wall outlet and converts alternating current (AC) to direct current (DC). DC power is supplied to the control unit 102. In some embodiments, instead of plugging into the wall outlet, the power supply 106 may be a battery pack. In some embodiments, the battery pack may be integrated into the control unit 102. The battery pack may use disposable batteries or a rechargeable pack. In some embodiments, the battery pack may be recharged by connecting the battery pack to a USB port.

Figure 2A:
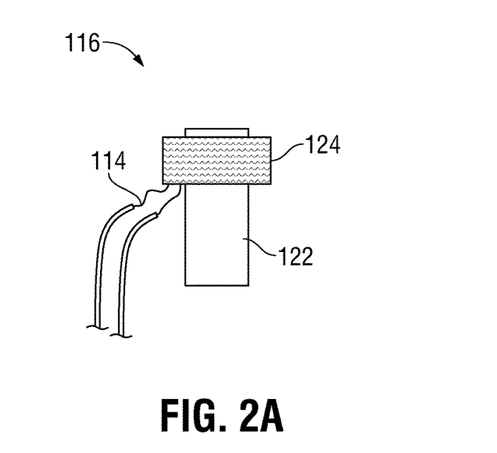
FIG. 2A illustrates a side view of a catalytic burner.
Figure 2B:
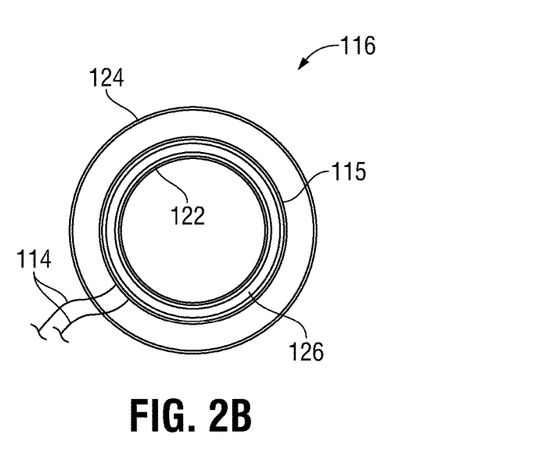
FIG. 2B illustrates a top view the catalytic burner of FIG. 2A.
Figure 2C:
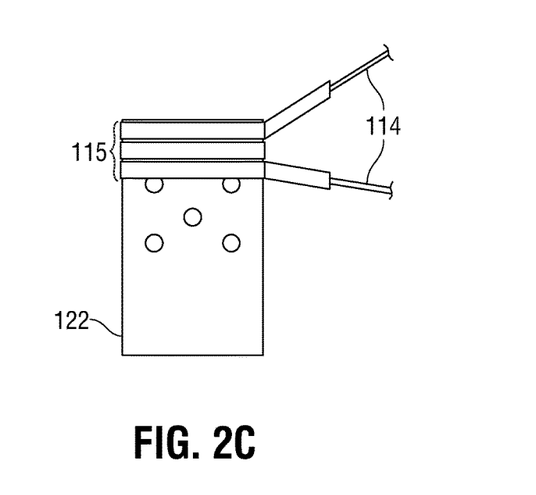
FIG. 2C illustrates a side view of the catalytic burner of FIG. 2A with a catalytic screen removed.

Referring now to FIGS. 2A-2C, a side view of a catalytic burner 116 is shown. The catalytic burner 116 includes a tube body 122, a catalytic screen 124, and a ceramic ring 126 that surrounds an upper portion of the tube body 122. The catalytic screen 124 comprises the catalytic material that, when heated to the necessary temperature, maintains the catalytic reaction. As shown in FIGS. 2B and 2C, the wire 114 is wrapped around the tube body 122 to form a wire coil 115. When electrical power is supplied to the wire coil 115 by controller unit 102, the wire coil 115 is heated. Heat radiates from the wire coil 115 to the catalytic screen 124 to heat the catalytic screen 124. In a typical embodiment, the ceramic ring 126 is positioned between the tube body 122 and the wire coil 115 to prevent the wire coil 115 from shorting to tube body 122. In some embodiments, the ceramic ring 126 may be removed and the wire 114 of the wire coil 115 may be covered with an insulating sheath (e.g., see FIG. 2C). In some embodiments, both the ceramic ring 126 and a wire 114 with an insulating sheath may be used. In a typical embodiment, electrical power is supplied to the wire coil 115 until the catalytic screen 124 has been heated to a temperature suitable for carrying out the catalytic burning process.

Referring now generally to FIGS. 3A-3E, an embodiment of a catalytic burner system 200 is shown. The catalytic burner system 200 includes a catalytic burner 204 that can be docked as shown in a base 202. In a typical embodiment, the base 202 is similar to the controller unit 102 described above. For example, the base 202 is adapted to supply electric power to the catalytic burner 204. In a typical embodiment, the base 202 includes a pair of electrical contacts that are adapted to mate up with a pair of electrical contacts on a bottom of the catalytic burner 204. Thus, while the catalytic burner 204 is docked in the base 202, electrical power can be supplied to the catalytic burner 204 to begin the catalytic burning process. Once the catalytic burning process has begun, the catalytic burner system 200 may be removed from the base 200 and relocated to a desired location.

In the embodiment shown in FIGS. 3A-3D, the base 202 includes a power connection 206 to receive power from, for example, a wall outlet. In other embodiments, the base 202 may include a battery to supply the electrical power to the catalytic burner.

Figure 3A:
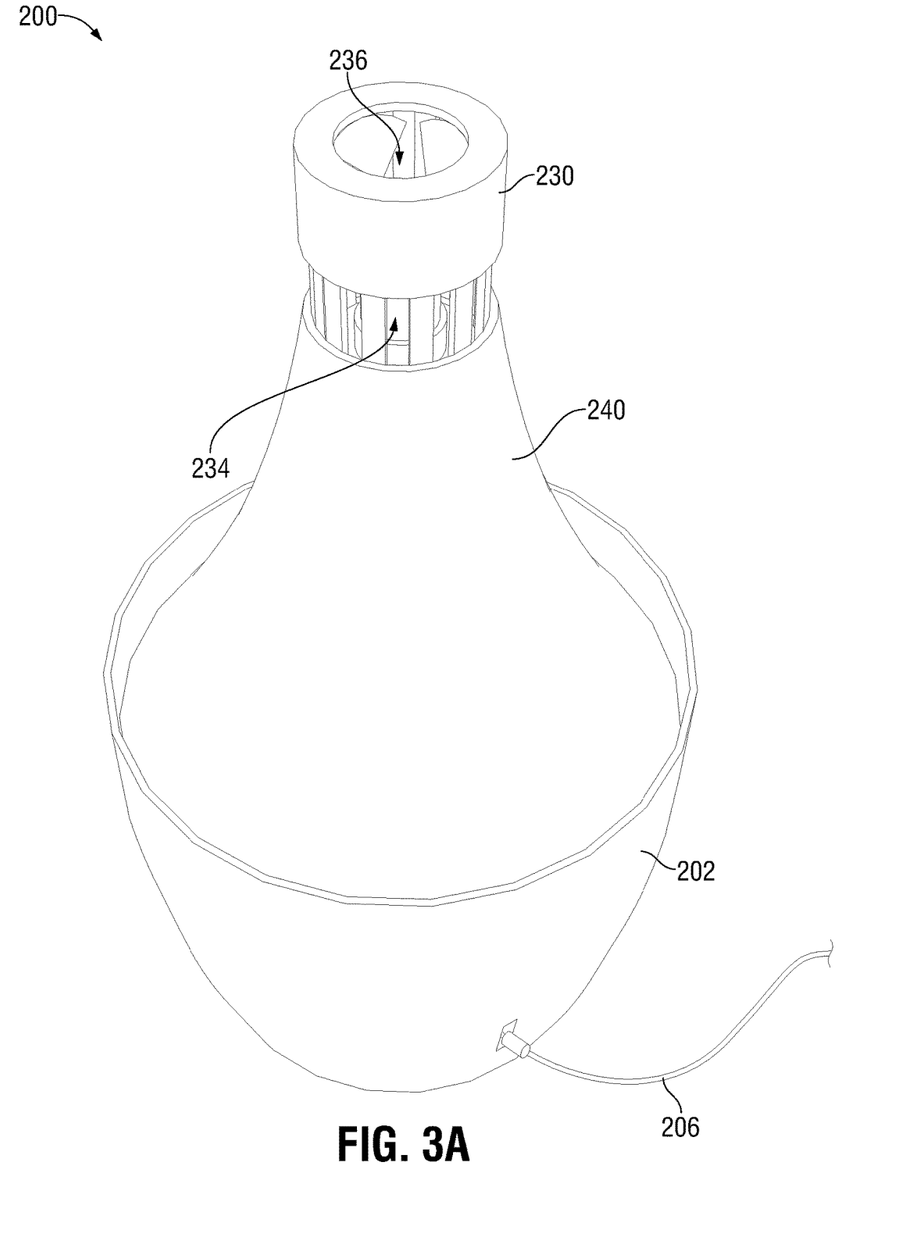
FIG. 3A illustrates a catalytic burner system with an air vent in an open position.
Figure 3B:
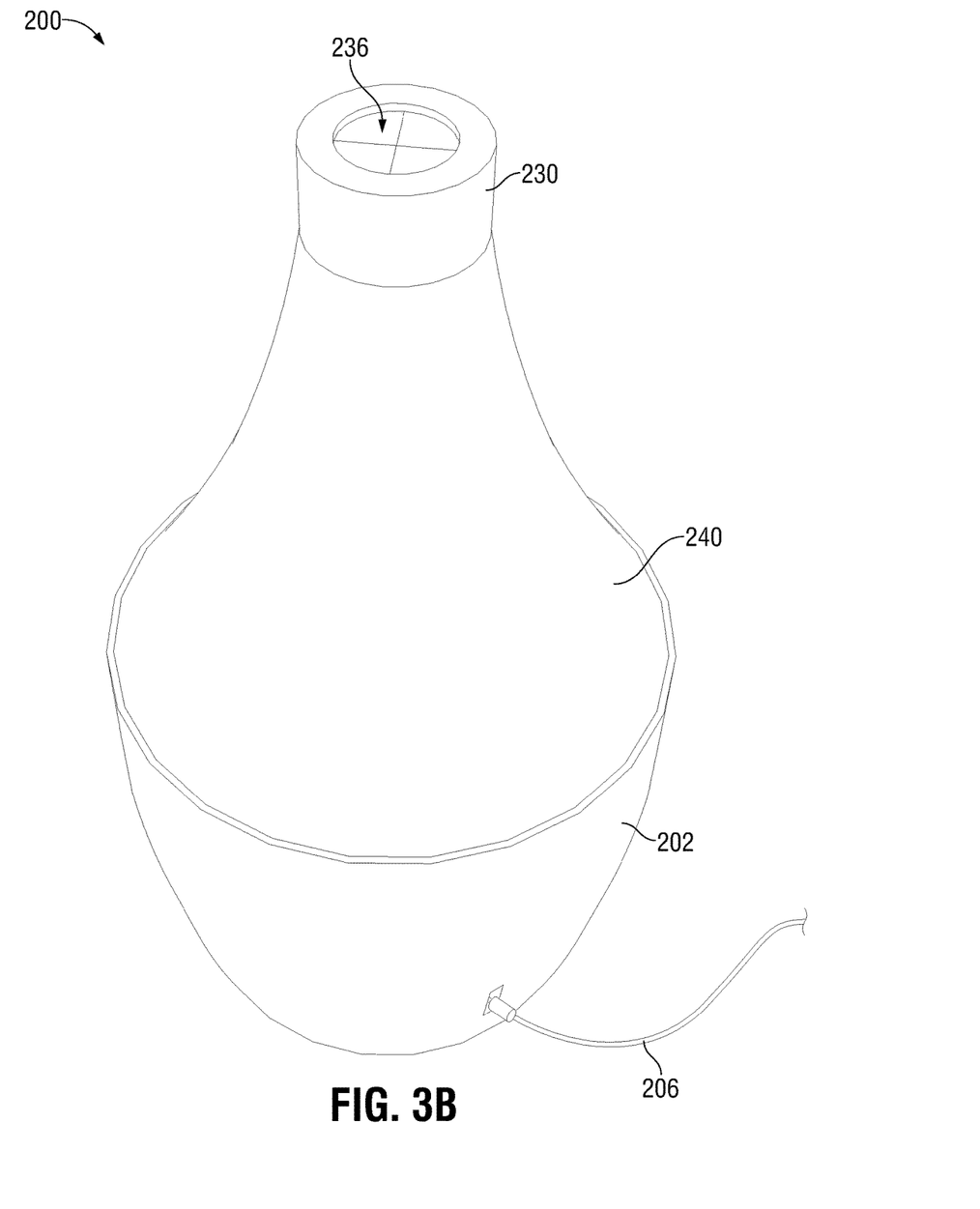
FIG. 3B illustrates the catalytic burner system of FIG. 3A, with the air vent in a closed position.
Figure 3C:
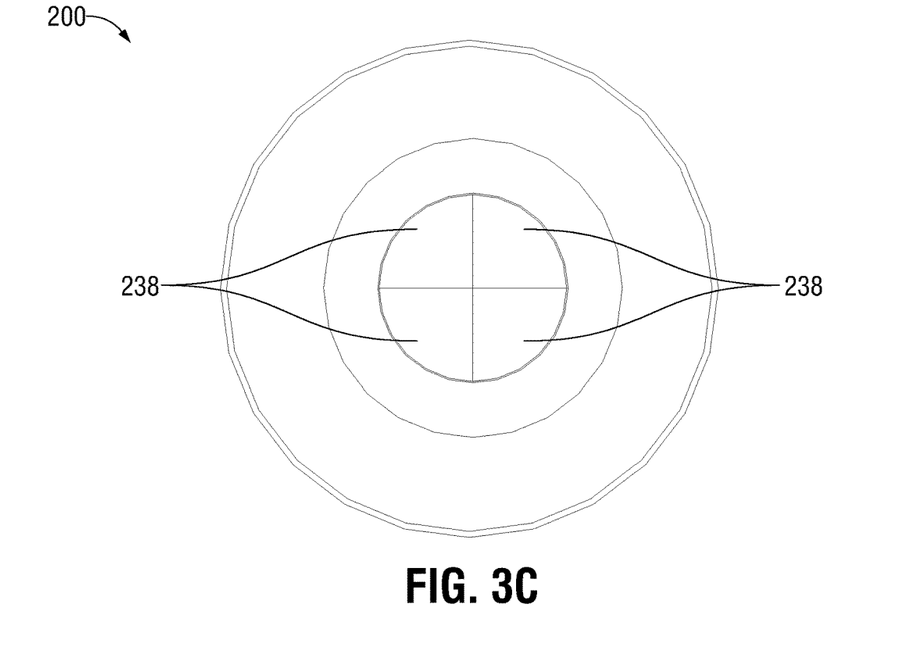
FIG. 3C illustrates a top view of the catalytic burner system of FIG. 3A, with a set of flaps in an open position.

Referring now specifically to FIGS. 3A and 3C, the catalytic burner system 200 is shown in an open position. In the open position, a top portion 230 of the catalytic burner system 200 is extended up to uncover vents 234. The vents 234 permit an inflow of air into the catalytic burner 204 (best seen in FIG. 3E) to facilitate the catalytic combustion process. The top portion 230 includes an opening 236 that permits combusted fuel to exhaust. The opening 236 includes a plurality of tabs 238 (best seen in FIG. 3C) that, in the open position, hang down away from the opening 236 to permit the combusted fuel to exit the catalytic burner 204.

Figure 3D:
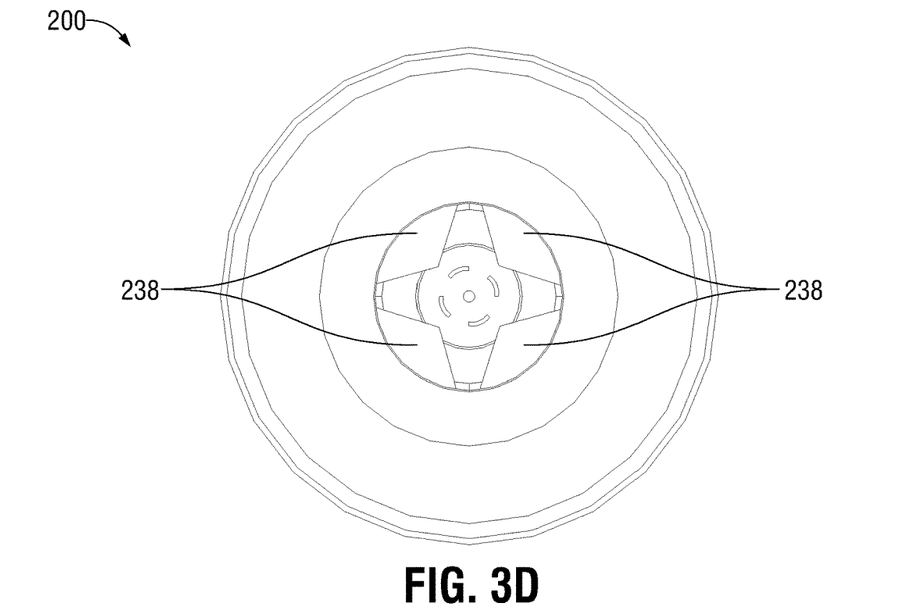
FIG. 3D illustrates a top view of the catalytic burner system of FIG. 3A, with the set of flaps in a closed position.

Referring now specifically to FIGS. 3B and 3D, the catalytic burner system 200 is shown in a closed position. In the closed position, the top portion 230 has been pushed down toward the base 202. Pushing the top portion 230 down causes the vents 234 to become covered up and the plurality of tabs 238 to fold upwards and inwards to seal off the opening 236. With the vents 234 covered, airflow to the catalytic burner 204 is cut off and the catalytic reaction will stop. The plurality of tabs 238 are shaped so that they block the opening 236 when the catalytic burner 204 is in the closed position. As shown in FIG. 3D, the plurality of tabs 238 includes 4 tabs. In other embodiments, the plurality of tabs 238 could be divided into more or fewer tabs as desired so long as the tabs come together in the closed position to block the opening 236.

Figure 3E:
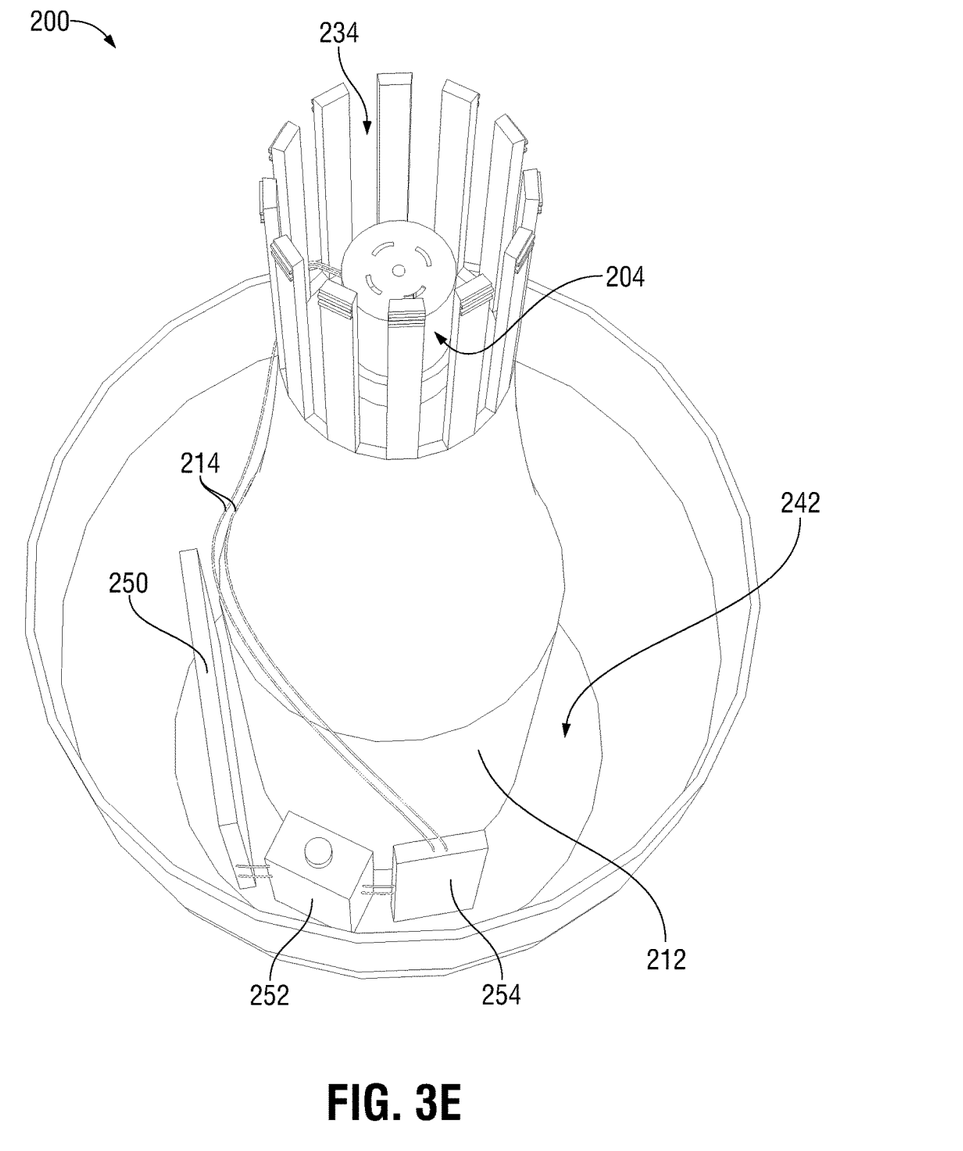
FIG. 3E illustrates the catalytic burner system of FIG. 3A with a top portion removed.

Referring now specifically to FIG. 3E, the catalytic burner system 200 is shown with a cover 240 (best seen in FIGS. 3A and 3B) removed. The catalytic burner system 200 includes a fuel reservoir 212 that is similar to the fuel reservoir 112. A cavity 242 is formed in a volume between the base 202 and the fuel reservoir 212. In a typical embodiment, the cavity 242 accommodates components to control the supply of electrical power to the catalytic burner 204. In a typical embodiment, the catalytic burner system 200 includes a control board 250 that controls activation of the catalytic burner 204. The control board 250 applies a power pulse of fixed duration and duty cycle to the wire coil (such as wire coil 115) via wires 214 in response to an activation of the catalytic burner system 200 (e.g., a push of a button by a user, transmission of wireless signal instructing the catalytic burner system 200 to ignite, etc.). In some embodiments, the control board 250 is in communication with a module 252 that is adapted to receive an instruction that the catalytic burner system 200 should ignite. For example, the module 252 may include a receiver for receiving a wireless instruction to ignite, a button or switch that may be actuated to provide an instruction to ignite, or the like. In some embodiments, a power unit 254, which is coupled to the control board 250, provides the power pulse as controlled by the control board 250. In a typical embodiment, there is a 'lock-out' time period, during which a second power pulse is prevented. This lock-out prevents multiple successive applications of power to the heater.

Figure 3F:
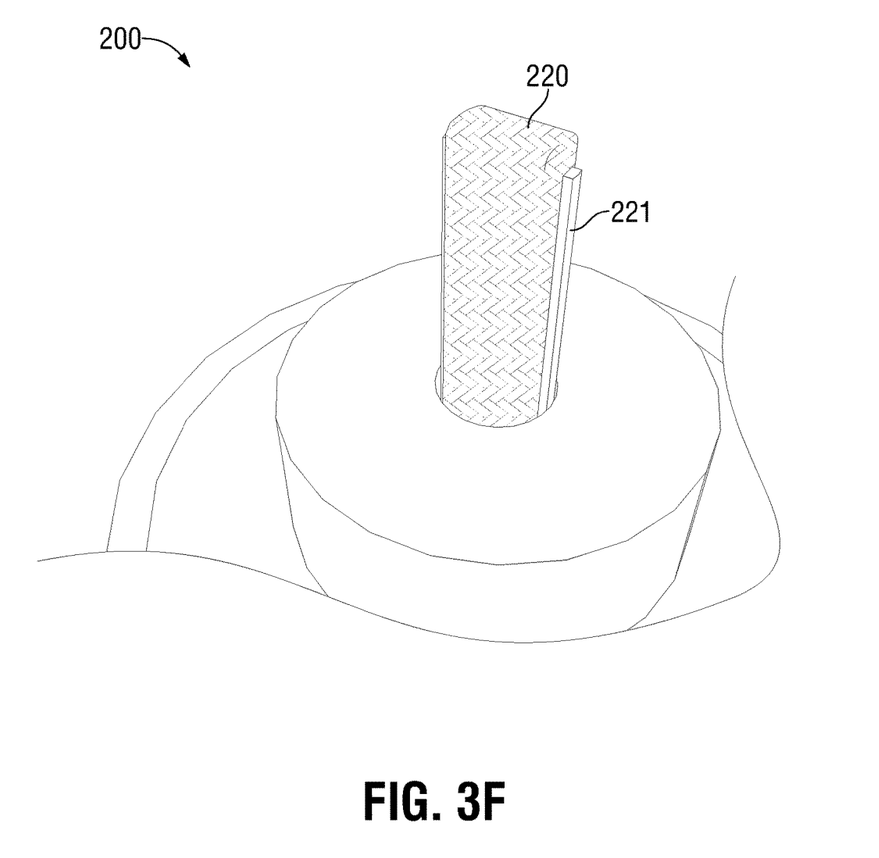
FIG. 3F illustrates the catalytic burner system of FIG. 3A a wick cover removed.

Referring now specifically to FIG. 3F, the catalytic burner system 200 is shown with the catalytic burner 204 removed. With the catalytic burner 204 removed, a wick 220 resting upon a tab 221 can be seen. The tab 221 helps position the wick 220 proximal to the catalytic burner 204 to maintain the catalytic reaction.

In certain embodiments of the invention where a tube-style housing is employed, the housing has a wall thickness ranging from 0.005 to 0.04 inches. A preferred wall thickness for a tubular housing is 0.01 inches. In an embodiment of the invention, the catalyzed substrate (20a) is wrapped around and/or over the tubular housing and held in place by connectors at a distance of 0.01 inches to 0.10 inches, and more preferably 0.05 inches from the outer surface of the tube.

In certain embodiments of the invention, the tubular body contains perforations around the circumferential portion of the tubular housing. The perforations permit a larger volume of vaporized fuel to reach the catalyst, in embodiments where the substrate containing the catalyst surrounds the tubular housing. The perforations may cover up to 90% of the surface of the tubular housing. In an embodiment of the invention, the perforations comprise 2% of the surface and are located along an upper circumferential portion of the tubular housing.

According to embodiments of the invention, the substrates comprising the catalyst are situated at a suitable distance from the wick to provide a limited region wherein the oxidation reaction temperature is lowered. Distribution of these catalytic surfaces provide for distribution of heat release within the burner. The catalytic substrates are sized to accomplish a nearly even temperature distribution along the burner. A nearly even temperature profile within the burner results in more uniform heat distribution. A more even temperature profile will also result in the lower maximum temperatures for the same heat release. Because the materials of construction of the burner dictate the maximum temperatures, even temperature profiles will increase the heat release possible for the same materials of construction.

Although various embodiments of the method and system of the present invention have been illustrated in the accompanying Drawings and described in the foregoing Specification, it will be understood that the invention is not limited to the embodiments disclosed, but is capable of numerous rearrangements, modifications, and substitutions without departing from the spirit and scope of the invention as set forth herein. It is intended that the Specification and examples be considered as illustrative only.

What is claimed is:

1. An electrically activated catalytic burner system comprising:
    a controller unit comprising a first pair of electrical contacts adapted to be coupled to a power source;
    a catalytic burner system comprising:
        a fuel reservoir;
        a second pair of electrical contacts positioned on the fuel reservoir to enable contact between the first and second pair of electrical contacts when the catalytic burner system is positioned in the controller unit; and
        a catalytic burner disposed above the fuel reservoir and proximal to a wick that extends from the catalytic burner to the fuel reservoir;
        a tube body that extends through the catalytic burner; and
    an electric ignition system adapted to be coupled to the power source to provide electrical power to the first pair of electrical contacts.

2. The electrically activated catalytic burner system of claim 1, wherein the electric ignition system comprises a wire connected at a first end to the second pair of electrical contacts and connected at a second end to a wire coil formed around the body tube of the catalytic burner and in proximity to a portion of the wick.

3. The electrically activated catalytic burner system of claim 2, wherein a ceramic ring is disposed between the wire coil and the body tube.

4. The electrically activated catalytic burner system of claim 2, wherein the wire comprises an insulating sheath.

5. The electrically activated catalytic burner system of claim 1, wherein electric ignition system includes a switch adapted to initiate ignition of the catalytic burner.

6. The electrically activated catalytic burner system of claim 1, wherein the controller unit further comprises a wireless radio adapted to receive a signal from a remote to initiate ignition of the catalytic burner.

7. The electrically activated catalytic burner system of claim 1, wherein the body tube comprises perforations along an upper portion of the body tube.

8. An electrically activated catalytic burner system comprising:
    a controller unit comprising an electric ignition system adapted to be coupled to a power source;
    a catalytic burner system electrically coupled to the controller unit, the catalytic burner system comprising:
        a fuel reservoir; and
        a catalytic burner disposed above the fuel reservoir and proximal to a wick that extends from the catalytic burner to the fuel reservoir;
        a tube body that extends through the catalytic burner; and
    wherein the electric ignition system provides electrical power to the catalytic burner to begin a catalytic reaction.

9. The electrically activated catalytic burner system of claim 8, wherein the electric ignition system is coupled to the catalytic burner by a wire and the wire forms a wire coil around the body tube of the catalytic burner in proximity to a portion of the wick.

10. The electrically activated catalytic burner system of claim 9, wherein a ceramic ring is disposed between the wire coil and the body tube.

11. The electrically activated catalytic burner system of claim 8, wherein electric ignition system includes a switch adapted to initiate ignition of the catalytic burner.

12. The electrically activated catalytic burner system of claim 8, further comprising:
wherein the catalytic burner system includes a top portion that is movable between a first position and a second position;
wherein in the first position air can enter the catalytic burner system through a vent that surrounds the catalytic burner and combusted fuel can exit the catalytic burner system through an opening above the catalytic burner; and
wherein in the second position flow of air through the vent impeded.

13. The electrically activated catalytic burner system of claim 12, further comprising:
at least one tab coupled adjacent to the opening;
wherein in the first position the at least one tab is moved away from the opening;
wherein in the second position the at least on tab is moved towards the opening.

14. A method of using a catalytic burner device, the method comprising:
heating a catalytic substrate of the catalytic burner device by providing electric power to an electric ignition system of the catalytic burner device; and
wherein the catalytic burner device comprises:
a controller unit comprising a first pair of electrical contacts adapted to be coupled to a power source;
a catalytic burner system comprising:
a fuel reservoir;
a second pair of electrical contacts positioned on the fuel reservoir to enable contact between the first and second pair of electrical contacts when the catalytic burner system is positioned in the controller unit; and
a catalytic burner disposed above the fuel reservoir and proximal to a wick that extends from the catalytic burner to the fuel reservoir;
a tube body that extends through the catalytic burner; and
wherein the electric ignition system is adapted to be coupled to the power source to provide electric power to the first pair of electrical contacts.

15. The method according to claim 14, wherein combustion of the fuel heats a housing of the catalytic burner device and the catalytic substrate.

16. The method according to claim 14, further comprising:
extinguishing the combusting fuel by moving a top portion of the catalytic burner device toward a base of the catalytic burner device, wherein moving the top portion closes a first opening of the catalytic burner device that allows combusted fuel and air to exit the catalytic burner device and a second opening of the catalytic burner device that allows inflow of air into the catalytic burner device; and
wherein the first opening is disposed above the catalyst substrate.

17. The method of claim 16, wherein closing the first opening comprises moving at least one tab to cover the first opening.

18. The method of claim 16, wherein closing the second opening comprises moving a top portion of the catalytic burner device to cover at least one vent of the second opening.

* * * * *